No. 713,257. Patented Nov. 11, 1902.
E. WESTON & A. O. BENECKE.
RECORDING ELECTRICAL MEASURING INSTRUMENT.
(Application filed Feb. 10, 1902.)
(No Model.) 4 Sheets—Sheet 1.
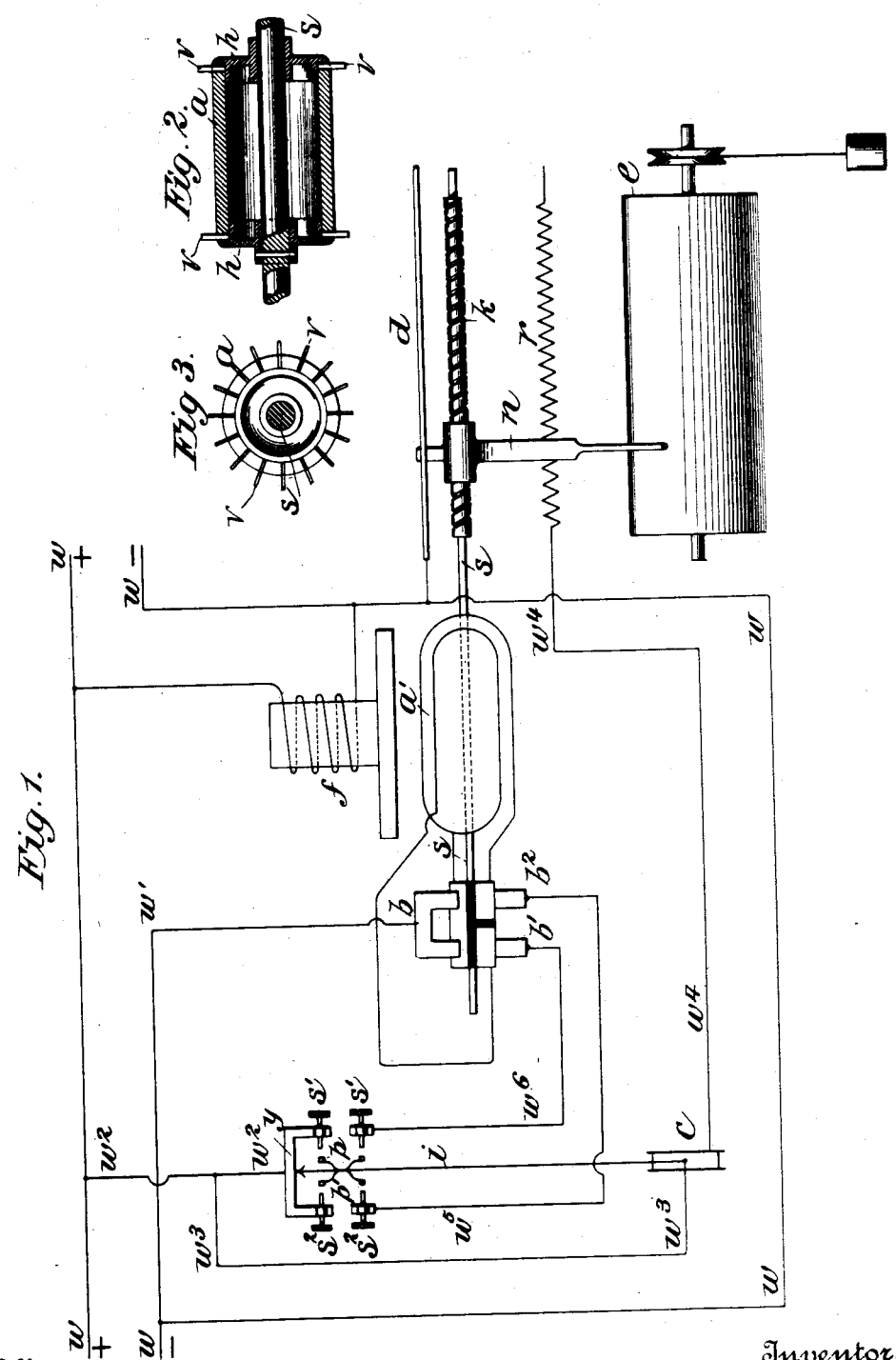

No. 713,257. Patented Nov. 11, 1902.
E. WESTON & A. O. BENECKE.
RECORDING ELECTRICAL MEASURING INSTRUMENT.
(Application filed Feb. 10, 1902.)

(No Model.) 4 Sheets—Sheet 2.

Witnesses

Edward Weston
Adelbert O. Benecke
Inventors

By their Attorney

No. 713,257. Patented Nov. 11, 1902.
E. WESTON & A. O. BENECKE.
RECORDING ELECTRICAL MEASURING INSTRUMENT.
(Application filed Feb. 10, 1902.)

(No Model.) 4 Sheets—Sheet 3.

No. 713,257. Patented Nov. 11, 1902.
E. WESTON & A. O. BENECKE.
RECORDING ELECTRICAL MEASURING INSTRUMENT.
(Application filed Feb. 10, 1902.)
(No Model.) 4 Sheets—Sheet 4.

Witnesses
Edward C. Rowland
M. F. Keating

Edward Weston
Adelbert O. Benecke
Inventors

By their Attorney
Charles J. Kintner

UNITED STATES PATENT OFFICE.

EDWARD WESTON, OF NEWARK, AND ADELBERT O. BENECKE, OF VAILSBURG, NEW JERSEY.

RECORDING ELECTRICAL MEASURING INSTRUMENT.

SPECIFICATION forming part of Letters Patent No. 713,257, dated November 11, 1902.

Application filed February 10, 1902. Serial No. 93,358. (No model.)

*To all whom it may concern:*

Be it known that we, EDWARD WESTON, a subject of the King of Great Britain, residing at Newark, and ADELBERT O. BENECKE, a subject of the Emperor of Germany, residing at Vailsburg, in the county of Essex and State of New Jersey, have made a new and useful Invention in Recording Electrical Measuring Instruments, of which the following is a specification.

Our invention is directed to improvements upon instruments disclosed in two prior patents granted to Edward Weston by the United States Patent Office on the 31st day of January and 4th day of April, 1893, and numbered, respectively, 490,699 and 494,829, and will be understood by referring to the following specification and accompanying drawings, the especial points of novelty being particularly pointed out in the claims at the end of the specification.

Figure 4:
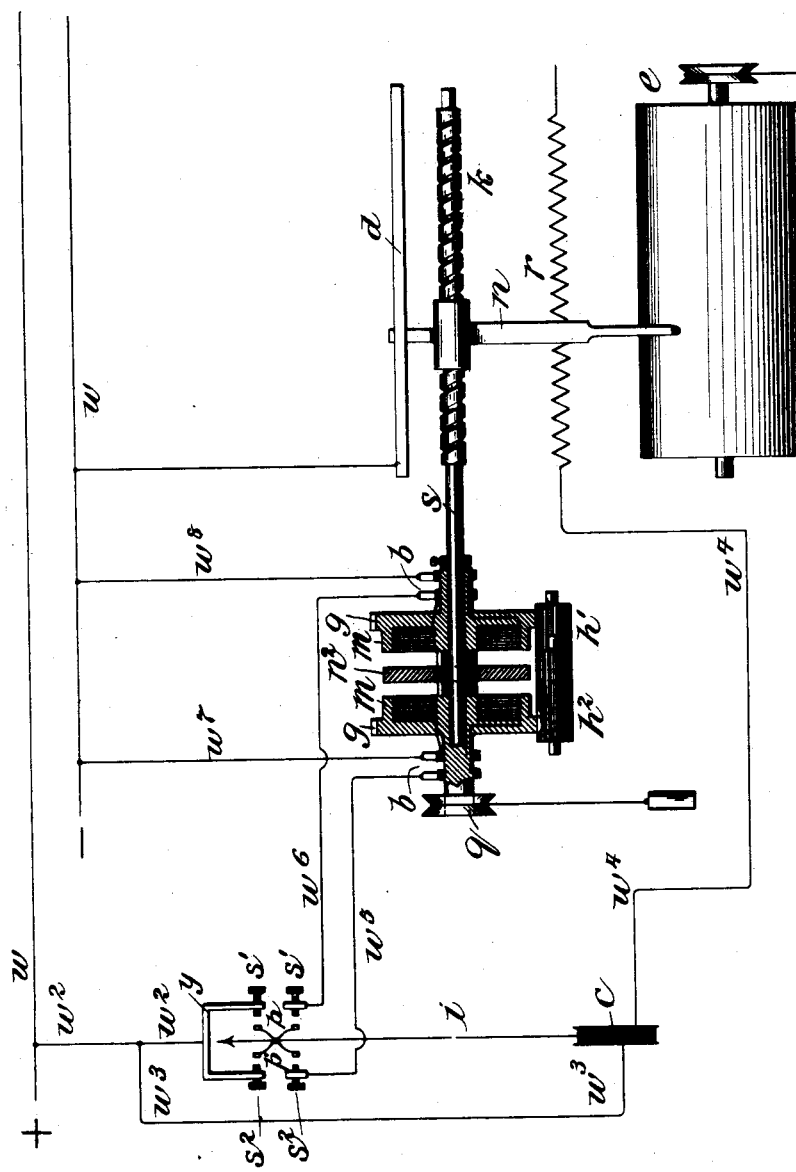
Figure 5:
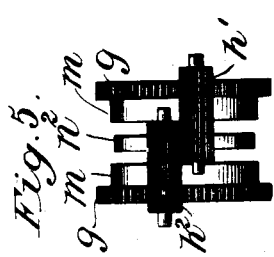
Figure 6:
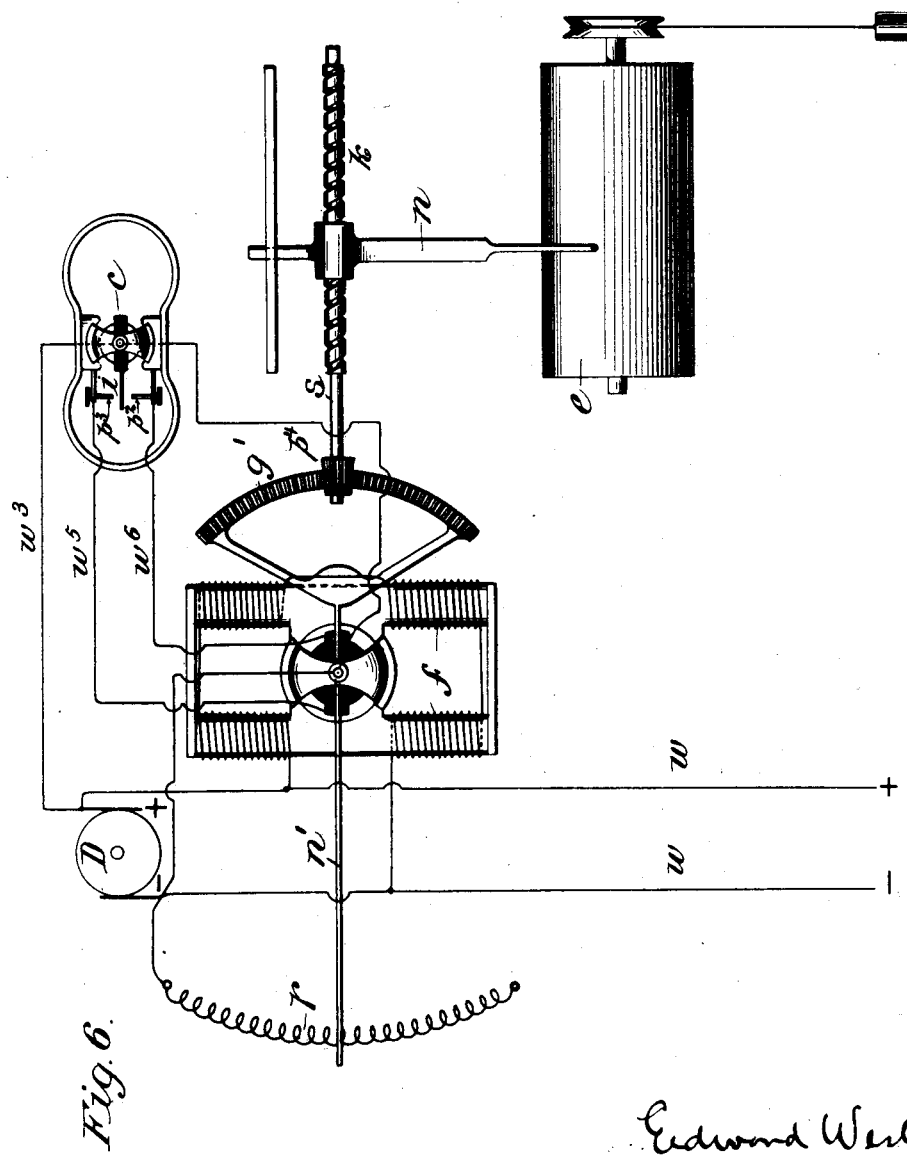
Figure 7:
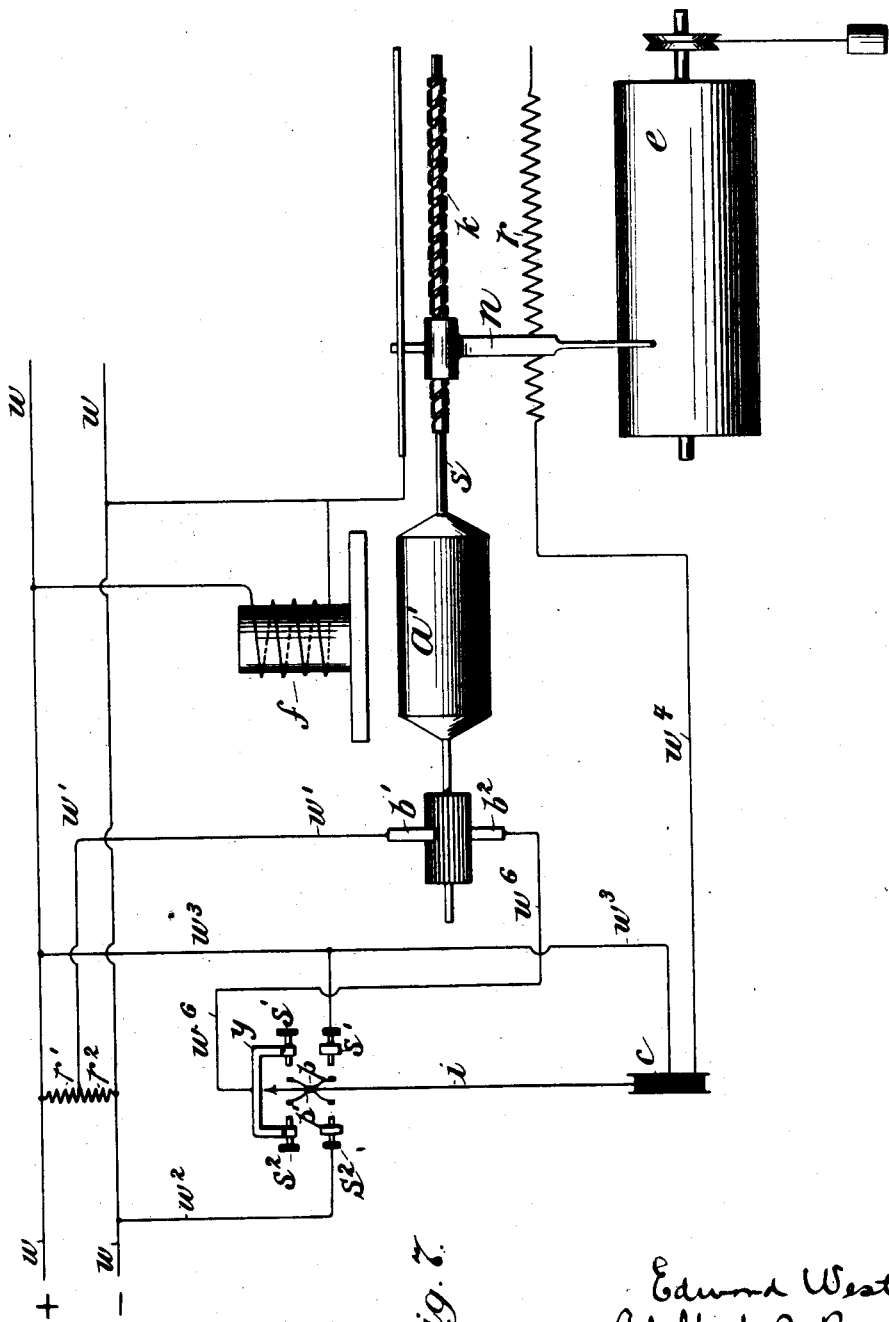

Figures 1, 6, and 7 are part diagrammatic, part plan views, illustrating our improvements as applied to voltmeters. Fig. 4 is a part diagrammatic, part plan view, of a modified form of the invention, the means for reversing the direction of motion of the recording-stylus carried by the power-impelled shaft being shown therein in sectional view. Fig. 2 is a sectional view taken through the core of the preferred form of rotary armature which drives the recording mechanism when an electric motor is used for that purpose, as illustrated in the modified forms shown in Figs. 1 and 7. Fig. 3 is an end elevational view of the same as seen looking at Fig. 2 in either direction with one of the conducting heads or caps of the armature-core removed. Fig. 5 is a detail view illustrating the gearing and connected parts for reversing the direction of motion of the recording-stylus of that form of the invention illustrated in Fig. 4.

Our invention has for its objects, first, to provide means whereby an increased range of record may be effected, and in such manner as to make a permanent record of relatively small changes either of differences of potential or of current-flow or of the work being done in an electrical circuit, according to the type of instrument employed; second, to provide novel means whereby the recording-stylus may be driven by a rotary movable armature capable of making either a fractional part of a revolution or a number of revolutions in either direction and in such manner as to give to said stylus wide ranges of movement over the record-receiving surface or sheet; third, to provide a power-driven recording mechanism in connection with instruments like those disclosed in the before-mentioned patents in which the record shall be placed upon a record sheet or surface on rectangular coördinate lines and in such manner that the spaced coördinates of the record as to time and as to quantity or potential or the work done shall bear a definite or fixed relation to each other; fourth, to combine with the motor-driven part of the recording instrument a dampening device, which will instantly check the movement of the rotary part thereof, and hence the movement of the stylus when the propelling part is disconnected from the working source which drives it; fifth, to provide an armature-core for the armature that drives the recording-stylus which shall be of such a nature as to start and stop instantaneously on connecting or disconnecting the working current through or from the coils thereof, thus making the instrument far more accurate in its recording function than was possible with the instruments disclosed in the before-mentioned patents.

In each of the instruments referred to there is a vibrating recording-arm which carries a stylus or pointer at its free end, said stylus being adapted to move over a record divided into coördinate lines indicating hours and amperes or volts, according to the type of instrument used. With such an instrument, however, it became necessary to vary the relation of the coördinate lines of the record representing amperes or volts in order to compensate for the angular variation of the recording-stylus at the extreme limits of its movement, as is obvious on inspection of the drawings of Patent No. 490,699, above referred to, and on examination of the specification thereof, lines 54 to 68, inclusive, page 2. The present improvements are designed to overcome these objections and to provide an electrically-controlled recording instrument which shall give accurate records of differences of potential or changes of current or the rate of doing work in a system of electrical energy and of the time when such changes took place.

For a full and clear understanding of our invention, such as will enable others skilled in the art to construct and use the same, reference is now had to the accompanying drawings, and first to Fig. 1, in which like letters of reference represent like parts whenever used. $w\ w$ represent two current-mains connected to a source of current-supply and one or more electrical translating devices, (not shown,) and $f$ represents the field-magnet of an electric motor, the coils of which are connected in shunt with the current-mains. $a'$ represents the windings or coils of the rotary armature thereof, the shaft $s$ of which is connected at one end to a worm or screw $k$, the threads being of any desired pitch, dependent upon the power of the motor to drive it and the magnitude of the record it is desired to produce. $n$ is a conducting-arm provided with the requisite nut or connection for adapting it to be moved in either direction by the screw $k$, said arm supporting at its free end a recording-stylus of any well-known form. $d$ is a metal or other conducting-bar under which one end of the conducting-arm $n$ rests, said bar being electrically connected to the main $w$, and $r$ a known variable resistance, the individual coils of which are adapted to be electrically connected with the arm $n$ as it is moved back and forth thereover in the same manner as the corresponding conducting-arm is moved over the similar variable resistance disclosed in the before-mentioned patents and as illustrated in Fig. 6 of the drawings of the present application. $e$ is a cylinder adapted to carry a sheet of recording-paper or other material properly spaced with coördinate lines indicating hours and amperes or volts or watts, said cylinder being driven by a time-controlled clock mechanism (not shown) and at a definite speed. $c$ represents the movable member or part, and $i$ the index-needle of a voltmeter not substantially different from the like parts of well-known instruments of the Weston type. $p\ p'$ are pairs of contacts carried by the index-needle $i$ and adapted to contact when moved in opposite directions with adjustable stationary contacts $s'\ s'\ s^2\ s^2$, supported by the base of the instrument and a yoke $y$ connected by a conductor $w^2$ with one of the current-mains $w$. $b$ represents a double commutator-brush connected directly by a conductor $w'$ to one of the current-mains $w$ and to a pole-changing commutator of well-known form carried by the armature-shaft $s$, $b'\ b^2$ being independent commutator-brushes connected to the same commutator and by conductors $w^6\ w^5$ to the adjustable contacts $s'\ s^3$. $w^3\ w^4$ are conductors connected in circuit with the movable coil $c$ of an electrical measuring instrument and with the variable resistance $r$, upon which the arm $n$ rests. $a$ represents the core of the armature, made, preferably, of a magnetizable tube and secured to the armature-shaft $s$ by detachable heads $h\ h$ of some good conducting material, preferably aluminium, such an armature-core having the very desirable feature in connection with instruments of this type of starting and stopping quickly when the current is connected to or disconnected from the coils or windings $a'$ of the armature, thus acting as a damping device, which is a feature of great importance in this connection in that it insures an accurate record of sudden or instantaneous variations or changes of potential difference or current-flow, as will be more particularly pointed out in connection with the description of the mode of operation. $v\ v\ v$ represent strips of mica or equivalent insulating material inserted in slots in the ends of the core $a$ and held in place by the heads $h\ h$ when the latter are secured to the shaft $s$, the function of said strips being to facilitate the winding of the coil $a'$ thereon. The armature-coil $a'$ is connected in its middle to the long section of the commutator, as shown, and at its opposite ends to the short sections of said commutator, which are insulated from each other and the long section, the arrangement being such that as the armature is rotated the double brush $b$ and the single brushes $b'\ b^2$ rest alternately upon the sections and reverse the direction of the current through the coil, dependent upon which of the contacts $s'$ or $s^2$ is connected to the contacts $p\ p'$. The operation of this form of the apparatus is as follows: Suppose the instrument to be a voltmeter and to be connected in circuit with a source of current-supply designed to deliver current to translating devices at a definite voltage, under which condition the index-needle $i$ is so adjusted as to stand with the pair of contacts $p\ p'$ closely adjacent to the pairs of stationary contacts $s'\ s'$ and $s^2\ s^2$ and with its pointer indicating the voltage on the scale of the instrument. The field-magnet $f$ of the motor here shown in shunt to the current-mains is continuously magnetized and no current is flowing through the armature, the circuit being open for the coils thereof at the points between the contacts $s'\ s'$, $s^2\ s^2$, and $p\ p'$. The record-cylinder $e$ is set in motion, with the stylus making the usual right line thereon so long as the arm $n$ remains in the position shown. Should the voltage be increased for any reason whatever, the movable coil $c$ of the voltmeter will cause the index $i$ to move to the right, as is usual in such instruments. Consequently the circuit is immediately closed between the contacts $p$ and the stationary contacts $s'\ s'$ and current flows by way of the conductor $w^2$, yoke $y$, upper contact $s'$, contacts $p$, lower contact $s'$, conductor $w^6$, commutator-brush $b'$ through one coil of the armature, brush $b$, and conductor $w'$ to the other current-main. Suppose that this causes the arm $n$ to move from left to right. This movement of the arm will continue, therefore, until additional resistance of the variable resistance $r$ has been cut into circuit with conductor $w^4$ and coil $c$ to a sufficient amount to cause the index-needle $i$ to recede to its central position. Consequently a record is made upon the record-sheet carried by the cylinder $e$, indicating the increase in voltage for the time being, and the extent or magnitude of this record is dependent upon the pitch of the screw $k$, the record-line itself indicating volts as it passes from left to right and the rotation of the cylinder indicating fractions of hours in a manner not substantially different from that described in the before-mentioned patents, except that, as hereinbefore stated, with this instrument it is possible to make a magnified record of minute variations in voltage or quantity in accordance with the type of instrument used. It will be readily appreciated that any diminution in the voltage will in like manner cause the index-needle $i$ to move to the left, closing the circuit through the contacts $s^2$ $s^2$ $p'$, branch conductor $w^5$ to the commutator-brush $b^2$ and the other coil of the armature, causing the armature to reverse its direction of rotation, and hence impart to the arm $n$ movement from right to left, thus giving an indication both as to the decrease of the voltage and as to the time during which such decrease took place. This movement of the arm $n$ to the left will for obvious reasons decrease the resistance in the conductor $w^4$ and coil $c$ of the voltmeter, causing the index-needle $i$ to again return to its central position. The armature-core $a$ being of magnetizable metal and provided with heads or ends $h$ $h$ of good conducting material, preferably aluminium, will act instantaneously as a magnetic dampening device to check any rotation due to momentum, so that the instant the current is interrupted the arm $n$ will cease to move. For like reason the instant that the circuit is closed through either of the coils the armature will be set in motion. Although we prefer to use a dampening device in the nature of a magnetic core $a$, provided with conducting-heads $h$ $h$ of light material, such as aluminium, we do not limit this feature of our invention to such a structure, as obviously any of the well-known types of dampening devices which are used in connection with electrical measuring instruments or instruments of precision generally might be applied for the purpose indicated, our claims in this particular being directed, broadly, to recording apparatus for electrical measuring instruments the recording-stylus of which is driven by an electromotive device and in such manner that when the circuit is interrupted the movable part of the electromotive device will stop instantaneously, so as to cause the recording device to accurately record the current variations, which is the ultimate object sought, nor do we limit our invention in so far as it is applicable to electrical measuring instruments to instruments of the electromagnetic type, such as are disclosed in Edward Weston's before-mentioned patents, the invention being obviously applicable in connection with electrical measuring instruments generally, wherein one or more movable parts of the instrument may be used to control the movement of the recording apparatus for the purpose of making a permanent record of electrical conditions and the time of the occurrence thereof.

In Fig. 7 of the drawings we have illustrated a modified manner of connecting a source of electrical energy with the rotary armature of the electric motor which drives the recording-stylus, the arrangement being such that the apparatus may be used with any of the well-known types of electric motors found in the market. In this form of the apparatus we have avoided the use of the pole-changing commutator for the armature shown in Fig. 1 by connecting one of the commutator-brushes $b'$ by a conductor $w'$ running to the center of a two-part resistance $r'$ $r^2$, connected in shunt between the current-mains $w$ $w$, the other commutator-brush $b^2$ being connected by a conductor $w^6$ directly to the yoke $y$. The operation of this modified form will be apparent, it being obvious that when the index-needle $i$ is moved to the right the circuit will be closed from the + current-main $w$ by the conductor $w^3$, contacts $s'$ $p$ $s'$, yoke $y$, conductor $w^6$, commutator-brush $b^2$, coils of the armature $a'$, commutator-brush $b'$, conductor $w'$, resistance $r^2$ to the negative main, thereby imparting motion to the armature, say, in such a direction as to cause the arm $n$ to move from left to right. This will cause the arm to increase the resistance in the conductor $w^3$, coil $c$, conductor $w^4$, causing the index-needle $i$ to return to its central position. In a similar manner any diminution of the current-flow through the coil $c$ will cause the circuit to be closed between the contacts $p'$ $s^2$ $s^2$ on the left, thereby causing a current to flow from the positive main $w$ through the resistance $r'$, conductor $w'$, commutator-brush $b'$ in a reverse direction through the coils of the armature $a'$, commutator-brush $b^2$, conductor $w^6$, yoke $y$, contacts $s^2$ $s^2$ $p'$, conductor $w^2$ to the negative main, causing the arm $n$ to move from right to left and the index-needle $i$ to be restored to its normal or central position.

In Fig. 6 of the drawings we have illustrated means for causing the stylus to travel in a right line over the record-surface in the same manner as disclosed in Figs. 1, 4, and 7 through the agency of a power-driven worm or screw $k$ and how the same may be applied directly to the structural apparatus disclosed in patent to Weston, No. 490,699, above referred to. In this figure of the drawings $d$ represents the dynamo or source of electrical energy, $w$ $w$ the current-mains operatively connected with translating devices, (not shown,) $f$ the field-magnet of the propelling electromotive device for the stylus, the coils of said field-magnet being, as before, in shunt relation to the current-mains. $n'$ is a conducting-arm carried by the vibrating armature in the field of the field-magnets $f$, and $r$ a resistance over which the arm $n'$ passes. $c$ is a movable coil of an electrical measuring instrument, as before, located in the field of a permanent magnet. $p^2$ $p^3$ are stationary contacts, and $i$ an index-needle carried by the coil $a$ and adapted to contact therewith when moved in opposite directions. $w^3$ $w^5$ $w^6$, &c., are conductors connecting the several parts of the apparatus, all of said parts, circuits, and circuit connections being identically the same as the like parts disclosed in the before-mentioned patent to Weston, No. 490,699. Our improvement in this connection embraces a rack or gear $g'$, carried at one end of the arm $n'$ and meshing with a pinion $p^4$, operatively connected with a rotary shaft $s$ and worm or screw $k$, the arm $n$, as before, being provided with the necessary nut or pin for giving to it and the stylus carried thereby motion in either direction as required, so that said stylus will move in a right line over the record surface or sheet on the cylinder $e$. The operation of this modified form will be obvious, it being apparent that the arm $n'$ will be moved from right to left, or vice versa, dependent upon the movement of the index-needle $i$, carried by the coil $c$, and also that when the arm is moved in one direction or the other the index-needle $i$ will ultimately return to its normal or central position, positive motion being imparted through the rack or gear $g'$, pinion $p^4$, shaft $s$, and worm or screw $k$ to the arm $n$, thus placing upon the record sheet or surface a record in the same manner as the like result was attained with the apparatus illustrated in Figs. 1 and 7.

In Fig. 4 of the drawings we have illustrated a still further modified form of apparatus for effecting the results sought. In this form of the apparatus the shaft $s$ is driven by a mechanical source of power acting upon a pulley $q$. $m$ and $m$ are magnetic clutches adapted to run loosely upon the shaft $s$, said clutches being provided with the usual magnetizing-coils electrically connected with current-collecting rings and pairs of brushes $b$ $b$, resting thereon, to conductors $w^5$ $w^7$ $w^6$ $w^8$ and each provided with gear-teeth $g'$ at its outer circumference, adapted to mesh, respectively, with pinions $h'$ $h^2$, which in turn mesh with each other. (See Fig. 5.) $n^2$ is a magnetic disk loosely keyed to the shaft $s$ and adapted to be moved in either one direction or the other, according to which of the two clutches is magnetized. The other parts of the apparatus and circuit and circuit connections are not substantially different from the like parts disclosed in Figs. 1 and 7, except that the circuit connections are varied here to suit the conditions of the clutching mechanism and the application of power from a mechanically-applied source of energy, a sustained weight being shown for this purpose. The operation of this form will now be described. Suppose an increase of current-flow through the coil $c$ to cause the index-needle $i$ to move to the right, thereby closing the circuit between the contacts $p$ and $s'$ $s'$. Consequently current flows from the positive main $w$ by conductor $w^2$, yoke $y$, contacts $s'$ $p$ $s'$, conductor $w^6$, brushes $b$, collecting rings and coil of the right-hand clutch $m$, conductor $w^8$ to the negative main $w$. This causes the right-hand magnetic clutch to draw the magnetic disk $n^2$, which is loosely keyed on the shaft $s$, to the right into frictional contact with its face, thereby imparting motion from the pulley $q$ through the left-hand clutch $m$, pinion $h^2$, pinion $h'$, right-hand clutch $m$, disk $n^2$ to the shaft $s$ in the proper direction to cause the arm $n$ to move, say, from left to right, so that the stylus carried thereby will place upon the record sheet or surface the necessary record, and the arm $n$ will cut into the circuit additional resistance to a sufficient extent to cause the index-needle $i$ to return to its normal or central position. Any diminution of the current through the coil $c$ will in like manner cause the index-needle $i$ to vibrate to the left, closing the circuit between the contacts $s^2$ $p'$ $s^2$, so that now current will flow from the positive-current main $w$ by the conductor $w^2$, yoke $y$, contacts $s^2$ $p'$ $s^2$, conductor $w^5$, brushes $b$, current-collecting rings and coil of the left-hand clutch $m$, conductor $w^7$ to the negative-current main, magnetizing the disk $n^2$ and causing it to be drawn to the left into frictional contact with the face of the clutch, thereby imparting motion directly from the clutch $m$ to the disk $n^2$, and hence to the shaft $s$, in such a direction as to cause the arm $n$ to move, say, from right to left until the current-flow increases through the coil $c$ a sufficient amount to return the needle $i$ to its central position, the proper record in the meantime having been placed upon the record surface or sheet. This form of the apparatus is illustrated to show how our improvements may be utilized in connection with motive devices generally for moving the stylus in different directions. While we have illustrated in the accompanying drawings and have described hereinbefore a number of modified means whereby the results sought may be accomplished, we do not limit our invention to these specific structural arrangements, as many of the details of our invention may be materially departed from and still come within the scope of our claims hereinafter made. While we have defined that part of the recording instrument which moves back and forth over the record surface or sheet as a "stylus," we do not wish to be limited in this particular to any specific form of stylus or recording element, as obviously any movable element which would produce upon the record surface or sheet carried by the cylinder $e$ a record-line might be substituted for what is known generically in the art as a "stylus."

Having thus described our invention, what we claim, and desire to secure by Letters Patent of the United States, is—

1. An electrical measuring instrument having a movable part; in combination with an electric motor having a rotary armature capable of making either a fractional part of a revolution or a number of revolutions in opposite directions and a time-controlled recording instrument having its stylus operatively connected to said armature; together with a circuit and circuit connections and a source of electricity, whereby any substantial movement imparted to the movable part of the measuring instrument will cause the recording-stylus to make a permanent record of the nature and duration thereof, substantially as described.

2. An electrical measuring instrument having a movable part; an electric motor having a rotary armature capable of making either a fractional part of a revolution or a number of revolutions in opposite directions; a time-controlled recording instrument having a recording-stylus operatively connected to said armature by means adapted to move it in a right line; in combination with and circuits and circuit connections between the motor, the movable part of the measuring instrument and a source of electricity, whereby any substantial variation of movement imparted to said movable part will cause a permanent record of the nature and duration thereof, substantially as described.

3. An electrical measuring instrument having a movable part; an electric motor having a rotary armature capable of making either a fractional part of a revolution or a number of revolutions in opposite directions; a time-controlled recording instrument having a recording-stylus connected to the armature by means adapted to give it movement in opposite directions in a right line, the time-controlled recording instrument being provided with a record sheet or surface having coördinate record-lines thereon; in combination with circuits and circuit connections between the motor, the movable part of the measuring instrument and a source of electricity, whereby any substantial movement imparted to the movable part of the measuring instrument will cause a permanent record of the nature and duration thereof, substantially as described.

4. An electrical measuring instrument having a movable part; an electromotive device having its armature connected to the stylus of a time-controlled recording instrument; together with a dampening device capable of instantly stopping the armature of the electromotive device when the circuit is interrupted thereto; in combination with a source of electrical energy and circuits and circuit connections whereby any substantial movement of the movable part of the measuring instrument will cause an accurate permanent record of the nature and duration thereof, substantially as described.

5. An electrical measuring instrument having a movable part; an electric motor having an armature capable of making either a fractional part of a revolution or a number of revolutions in opposite directions, said armature having a tubular core with conducting-heads; in combination with a recording device having a stylus connected to the armature; together with circuits and circuit connections between the movable part of the measuring instrument, the electric motor and a source of electricity, whereby accurate permanent records are made by the current variations, substantially as described.

6. In an electrically-controlled recording instrument, a recording-stylus operatively connected to the armature of an electromotive device having a dampening-cord adapted to suddenly check or stop its movement when the motive device is disconnected from the driving source of electrical energy, substantially as described.

In testimony whereof we have signed our names to this specification in the presence of two subscribing witnesses.

EDWARD WESTON.
ADELBERT O. BENECKE.

Witnesses:
W. H. YAWGER,
C. J. KINTNER.

Correction in Letters Patent No. 713,257.

It is hereby certified that in Letters Patent No. 713,257, granted November 11, 1902, upon the application of Edward Weston, of Newark, and Adelbert O. Benecke, of Vailsburg, New Jersey, for an improvement in "Recording Electrical Measuring Instruments," an error appears in the printed specification requiring correction, as follows: In line 88, page 5, the word "dampening-cord" should read *dampening-core;* and that the said Letters Patent should be read with this correction therein that the same may conform to the record of the case in the Patent Office.

Signed and sealed this 25th day of November, A. D., 1902.

[SEAL.]

F. I. ALLEN,
*Commissioner of Patents.*